United States Patent
Roesch

(10) Patent No.: US 8,070,079 B2
(45) Date of Patent: Dec. 6, 2011

(54) METHOD FOR PRODUCING A SILANE MODIFIED SURFACE NANO-CORUNDUM

(75) Inventor: Norbert Roesch, Gersthofen (DE)

(73) Assignee: Clariant Finance (BVI) Limited, Tortola (VG)

( * ) Notice: Subject to any disclaimer, the term of this patent is extended or adjusted under 35 U.S.C. 154(b) by 238 days.

(21) Appl. No.: 11/990,373

(22) PCT Filed: Aug. 16, 2006

(86) PCT No.: PCT/EP2006/008064
§ 371 (c)(1),
(2), (4) Date: Feb. 2, 2009

(87) PCT Pub. No.: WO2007/020061
PCT Pub. Date: Feb. 22, 2007

(65) Prior Publication Data
US 2009/0302138 A1    Dec. 10, 2009

(30) Foreign Application Priority Data
Aug. 18, 2005    (DE) .................... 10 2005 039 435

(51) Int. Cl.
*B02C 19/00*    (2006.01)
(52) U.S. Cl. ................. 241/16; 241/21; 241/23
(58) Field of Classification Search .......... 241/16, 241/21, 22, 23, 65
See application file for complete search history.

(56) References Cited

U.S. PATENT DOCUMENTS

| | | |
|---|---|---|
| 5,384,194 A | 1/1995 | Deusser et al. |
| 5,419,928 A | 5/1995 | Deusser et al. |
| 5,501,933 A | 3/1996 | Deusser et al. |
| 6,020,419 A | 2/2000 | Bock et al. |
| 6,558,740 B1 * | 5/2003 | Santo et al. .................... 427/146 |
| 6,841,497 B1 | 1/2005 | Krell et al. |
| 7,125,539 B2 | 10/2006 | Martin et al. |
| 2003/0148042 A1* | 8/2003 | Wang ............................ 427/601 |
| 2004/0247520 A1 | 12/2004 | Martin et al. |
| 2005/0084607 A1 | 4/2005 | Wang |
| 2005/0135995 A1* | 6/2005 | Wang ............................ 423/625 |
| 2006/0194886 A1 | 8/2006 | Adam et al. |
| 2007/0142495 A1 | 6/2007 | Neffgen et al. |
| 2009/0041656 A1 | 2/2009 | Roesch et al. |
| 2009/0123362 A1 | 5/2009 | Roesch |
| 2009/0173253 A1 | 7/2009 | Roesch et al. |
| 2010/0006005 A1 | 1/2010 | Roesch et al. |
| 2010/0009187 A1 | 1/2010 | Roesch |

FOREIGN PATENT DOCUMENTS

| | | |
|---|---|---|
| CN | 1370743 | 9/2002 |
| CN | 1602332 | 3/2005 |
| DE | 4202694 | 7/1993 |
| DE | 19811790 | 9/1999 |
| DE | 19922492 | 11/2000 |
| DE | 10304849 | 8/2004 |
| EP | 1570831 | 9/2005 |
| GB | 2184715 | 7/1987 |
| WO | WO/02051376 | 7/2002 |
| WO | WO 03/033405 | 4/2003 |
| WO | WO 03/055939 | 7/2003 |

OTHER PUBLICATIONS

English Abstract for CN 1370743, Sep. 25, 2002.
PCT Search Report for PCT/EP2006/008064 mailed Nov. 20, 2006.
PCT International Preliminary Report on Patentability for PCT/EP2006/008064, mailed Nov. 5, 2007.
Oberbach et al. "Methods for Producing Corundum at Low Temperatures," DKG 74 No. 11/12, pp. 719-722 (1997).
English Abstract for WO/02051376, Jul. 4, 2002.

* cited by examiner

*Primary Examiner* — Mark Rosenbaum
(74) *Attorney, Agent, or Firm* — Anthony A. Bisulca

(57) ABSTRACT

The invention relates to a process for producing a silane-modified nano-corundum, wherein nano-corundum agglomerates are disagglomerated in the presence of an organic solvent and simultaneously or afterwards treated by silane.

4 Claims, No Drawings

METHOD FOR PRODUCING A SILANE MODIFIED SURFACE NANO-CORUNDUM

The present invention relates to the production of nanosize α-alumina (α-$Al_2O_3$) which has been surface modified by means of silanes.

Fine aluminum oxide powders are used, in particular, for ceramic applications, for matrix reinforcement of organic or metallic layers, as fillers, polishing powders, for the production of abrasives, as additives in surface coatings and laminates and for further specific applications. For use in laminates, the aluminum oxide powders are frequently surface-modified by means of silanes in order to achieve better adaptation to the resin layers. Here, both the adhesion and the optical properties are improved. This is then reflected in a decrease in clouding. A silane-modified pyrogenic aluminum oxide for use in toners is also known (DE 42 02 694).

Nanoparticles which are composed of $Al_2O_3$ and whose surface has been modified by means of silanes are described in WO 02/051376. The production of these starts out from a commercial $Al_2O_3$ which is then treated with a silane. Production of the nanoparticles and modification of these are thus carried out in two separate steps. Commercial nanosize α-alumina (α-$Al_2O_3$) is in the form of a powder. However, due to the high surface energy, nanoparticles are always agglomerated to form large agglomerates, so that in reality the powders are not composed of genuine nanoparticles. The silane-coated particles according to WO 02/051 376 are also of a corresponding size.

It has now been found that α-$Al_2O_3$ nanoparticles which have been modified by means of silanes and have a very small particle size can be obtained when coarser agglomerates of α-$Al_2O_3$ are deagglomerated in the presence of an organic solvent with addition of a silane.

The invention accordingly provides a process for producing nanosize α-alumina which has been modified by means of silanes, which comprises deagglomerating agglomerates of nanosize α-alumina in the presence of an organic solvent and a silane.

The process of the invention starts out from relatively large agglomerates comprising crystallites of nanosize α-alumina. The term "nanosize α-alumina" is generally taken to refer to particles having an average particle size of from 1 to 200 nm, preferably from 1 to 100 nm. These agglomerates are known per se and can, for example, be produced by processes described below:

Chemical syntheses are mostly precipitation reactions (hydroxide precipitation, hydrolysis of metal-organic compounds) with subsequent calcination. Crystallization nuclei are frequently added in order to reduce the transformation temperature to α-aluminum oxide. The sols obtained in this way are dried and thus converted into a gel. Further calcination then takes place at temperatures in the range from 350° C. to 650° C. To bring about the transformation into α-$Al_2O_3$, ignition at temperatures of about 1000° C. then has to be carried out. The processes are comprehensively described in DE 199 22 492.

A further way of obtaining nanosize materials is the aerosol process. Here, the desired molecules are obtained from chemical reactions of a precursor gas or by rapid cooling of a supersaturated gas. The formation of particles occurs either by collision or the continual vaporization and condensation of clusters of molecules which take place in equilibrium. The newly formed particles grow as a result of further collision with product molecules (condensation) and/or particles (coagulation). If the coagulation rate is greater than the rate of new formation or growth, agglomerates of spherical primary particles are formed.

Flame reactors represent a production variant based on this principle. Here, nanoparticles are formed by decomposition of precursor molecules in the flame at 1500° C.-2500° C. Examples which may be mentioned are the oxidations of $TiCl_4$; $SlCl_4$ and $Si_2O(CH_3)_6$ in methane/$O_2$ flames, which lead to $TiO_2$ and $SiO_2$ particles. When $AlCl_3$ was used, only the corresponding alumina could hitherto be produced. Flame reactors are nowadays used industrially for the synthesis of submicron particles such as carbon black, pigment $TiO_2$, silica and alumina.

Small particles can also be formed from droplets by means of centrifugal force, compressed air, sound, ultrasound and further methods. The droplets are then converted into powder by direct pyrolysis or by means of in-situ reactions with other gases. Known processes which may be mentioned are spray drying and freeze drying. In spray pyrolysis, precursor droplets are transported through a high-temperature field (flame, furnace) which leads to rapid vaporization of the volatile component or initiates the decomposition reaction to the desired product. The desired particles are collected in filters. An example which may be mentioned here is the preparation of $BaTiO_3$ from an aqueous solution of barium acetate and titanium lactate.

Milling can likewise be used to try to comminute α-alumina and thus produce crystallites in the nanosize range. The best milling results can be achieved in wet milling using stirred ball mills. Here, milling media composed of a material which is harder than α-alumina have to be used.

A further way of preparing α-alumina at low temperature is the conversion of aluminum chlorohydrate. For this purpose, the aluminum chlorohydrate is likewise admixed with inoculation nuclei, preferably of very fine α-alumina or hematite. To avoid crystal growth, the samples have to be calcined at temperatures of about 700° C. up to a maximum of 900° C. The calcination time is at least four hours. Disadvantages of this method are therefore the large time outlay and the residual amounts of chlorine in the aluminum oxide. This method has been comprehensively described in Ber. DKG 74 (1997) No. 11/12, pp. 719-722.

The nanoparticles have to be set free from these agglomerates. This is preferably achieved by milling or by treatment with ultrasound. According to the invention, this deagglomeration is carried out in the presence of a organic solvent and a silane which during the milling process saturates the resulting active and reactive surfaces by chemical reaction or physical attachment and thus prevents reagglomeration. The nanosize α-alumina remains in the form of small particles.

The production according to the invention of the mixed oxides preferably starts out from agglomerates which are produced as described in Ber. DKG 74 (1997) No. 11/12, pp. 719-722.

The starting point here is aluminum chlorohydrate of the formula $Al_2(OH)_xCl_y$, where x is from 2.5 to 5.5 and y is from 3.5 to 0.5 and the sum of x and y is always 6. This aluminum chlorohydrate is mixed as aqueous solution with crystallization nuclei, subsequently dried and then subjected to heat treatment (calcination).

The synthesis starts out from 50% strength aqueous solutions as are commercially available. Such a solution is admixed with crystallization nuclei which promote the formation of the α modification of $Al_2O_3$. In particular, such nuclei bring about a reduction in the temperature for the formation of the α modification in the subsequent heat treatment. Preferred nuclei are very finely divided α-alumina, diaspore or hematite. Preference is given to using very finely divided α-Al₂O₃ nuclei having an average particle size of less than 0.1 μm. In general, from 2 to 3% by weight of nuclei, based on the aluminum oxide formed, is sufficient.

This starting solution can additionally contain oxide formers. Possible oxide formers are, in particular, chlorides, oxychlorides and/or hydrochlorides of the elements of main groups II to V and of the transition groups, in particular the chlorides, oxychlorides and/or hydrochlorides of the elements Ca, Mg, Y, Ti, Zr, Cr, Fe, Co and Si.

This suspension of aluminum chlorohydrate, nuclei and, if appropriate, oxide formers is then evaporated to dryness and subjected to heat treatment (calcination). This calcination is carried out in apparatuses suitable for this purpose, for example in push-through, chamber, tube, rotary tube or microwave furnaces or in a fluidized-bed reactor. In one variant of the process of the invention, the aqueous suspension of aluminum chlorohydrate and nuclei can be sprayed without prior removal of water directly into the calcination apparatus.

The temperature for the calcination should not exceed 1100° C. The lower temperature limit is dependent on the desired yield of nanocrystalline α-alumina, on the desired residual chlorine content and on the content of nuclei. The formation of α-alumina commences at about 500° C., but to keep the chlorine content low and the yield of nanocrystalline α-alumina high, preference is given to temperatures of from 700 to 1100° C., in particular from 1000 to 1100° C.

It has been found that less than 30 minutes, preferably from 0.5 to 10 minutes, in particular from 0.5 to 5 minutes, generally suffice for the calcination. Even after this short time, a satisfactory yield of nanocrystalline α-alumina can be achieved under the abovementioned conditions for the preferred temperatures. However, it is also possible to calcine for 4 hours at 700° C. or for 8 hours at 500° C. as described in Ber. DKG 74 (1997) No. 11/12, p. 722.

Agglomerates of nanocrystalline α-alumina in the form of virtually spherical nanoparticles are obtained in the calcination. To obtain these nano-particles, the agglomerates are preferably comminuted by wet milling in a organic solvent, for example in an attritor mill or stirred mill. In this way, for example, a suspension of nanocrystalline α-alumina having a d50 of less than 100 nm is obtained after milling for two hours. Another possibility for deagglomeration is treatment with ultrasound.

There are two possibilities for the modification according to the invention of these nanoparticles by means of silanes. In a first variant, the deagglomeration can be carried out in the presence of the silane, for example by introducing the silane into the mill during milling. A second possibility is firstly to destroy the agglomerates of the nanoparticles and subsequently treat the nanoparticles, preferably in the form of a suspension in an organic solvent, with the silane.

As suitable silanes, preference is given to using the following types:
Possible silanes are compounds of the formulae a) 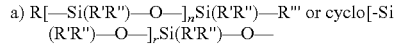 R[—Si(R'R'')—O—]ₙSi(R'R'')—R''' or cyclo[-Si(R'R'')—O—]ₛSi(R'R'')—O— where
R, R', R'', R''', are identical or different and are each an alkyl radical having 1-18 carbon atoms or a phenyl radical or an alkylphenyl or phenylalkyl radical having 6-18 carbon atoms or a radical of the formula —(C$_m$H$_{2m}$—O)$_p$—C$_q$H$_{2q+1}$ or a radical of the formula —C$_s$H$_{2s}$Y or a radical of the formula —XZ$_{t-1}$,
n is an integer such that 1≦n≦1000 preferably 1≦n≦100,
m is an integer such that 0≦m≦12 and p is an integer such that 0≦p≦60 and
q is an integer such that 0≦q≦40 and
r is an integer such that 2≦r≦10 and
s is an integer such that 0≦s≦18 and
Y is a reactive group, for example an α,β-ethylenically unsaturated group such as a (meth)acryloyl, vinyl or allyl group, an amino, amido, ureido, hydroxyl, epoxy, isocyanato, mercapto, sulfonyl, phosphonyl, trialkoxysilyl, alkyldialkoxysilyl, dialkylmonoalkoxysilyl, anhydride and/or carboxyl group, an imido, imino, sulfite, sulfate, sulfonate, phosphine, phosphite, phosphate, phosphonate group, and
X is a t-functional oligomer where
t is an integer such that 2≦t≦8, and
Z is in turn a radical

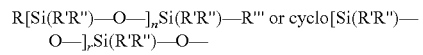 R[Si(R'R'')—O—]ₙSi(R'R'')—R''' or cyclo[Si(R'R'')—O—]ₛSi(R'R'')—O— as defined above.

The t-functional oligomer X is preferably selected from among:
oligoethers, oligoesters, oligoamides, oligourethanes, oligoureas, oligoolefins, oligovinyl halides, oligovinylidene dihalides, oligoimines, oligovinyl alcohol, esters, acetals and ethers of oligovinyl alcohol, cooligomers of maleic anhydride, oligomers of (meth)acrylic acid, oligomers of (meth)acrylic esters, oligomers of (meth)acrylamides, oligomers of (meth)acrylimides, oligomers of (meth)acrylonitrile, particularly preferably oligoethers, oligoesters, oligourethanes.

Examples of radicals of oligoethers are compounds of the type —(C$_a$H$_{2a}$—O)$_b$—C$_a$H$_{2a}$— or O—(C$_a$H$_{2a}$—O)$_b$—C$_a$H$_{2a}$—O where 2≦a≦12 and 1≦b≦60, e.g. a diethylene glycol, triethylene glycol or tetraethylene glycol radical, a dipropylene glycol, tripropylene glycol, tetrapropylene glycol radical, a dibutylene glycol, tributylene glycol or tetrabutylene glycol radical. Examples of radicals of oligoesters are compounds of the type —C$_b$H$_{2b}$—(C(CO)C$_a$H$_{2a}$—(CO)O—C$_b$H$_{2b}$—)$_c$— or —O—C$_b$H$_{2b}$—(C(CO)C$_a$H$_{2a}$—(CO)O—C$_b$H$_{2b}$—)$_c$—O— where a and b are identical or different and 3≦a≦12, 3≦b≦12 and 1≦c≦30, e.g. an oligoester of hexanediol and adipic acid.

b) Organosilanes of the type (RO)₃Si(CH₂)$_M$—R'
where R=alkyl such as methyl, ethyl, propyl,
m=0.1-20,
R'=methyl, phenyl,
   —C₄F₉; OCF₂—CHF—CF₃, —C₆F₁₃, —O—CF₂—CHF₂
   —NH₂, —N₃, —SCN, —CH=CH₂, —NH—CH₂—CH₂—NH₂,
   —N—(CH₂—CH₂—NH₂)₂
   —OOC(CH₃)C=CH₂
   —OCH₂—CH(O)CH₂
   —NH—CO—N—CO—(CH₂)₅
   —NH—COO—CH₃, —NH—COO—CH₂CH₃, —NH—(CH₂)₃Si(OR)₃
   —S$_x$—(CH₂)₃)Si(OR)₃
   —SH
   —NR'R''R'''(R'=alkyl, phenyl; R''=alkyl, phenyl; R'''=H, alkyl, phenyl, benzyl
   C₂H₄NR''''R''''' where R''''=A, alkyl and R'''''=H, alkyl).

Examples of silanes of the abovementioned type are hexamethyldisiloxane, octamethyltrisiloxane, further homologous and isomeric compounds of the series Si$_n$O$_{n-1}$(CH₃)$_{2n+2}$, where
   n is an integer such that 2≦n≦1000, e.g. polydimethylsiloxane 200® fluid (20 cSt).

Hexamethylcyclotrisiloxane, octamethylcyclotetrasiloxane, further homologous and isomeric compounds of the series (Si—O)$_r$(CH$_3$)$_{2r}$, where
r is an integer such that $3 \leq r \leq 12$,
dihydroxytetramethyldisiloxane, dihydroxyhexamethyltrisiloxane, dihydroxyoctamethyltetrasiloxane, further homologous and isomeric compounds of the series

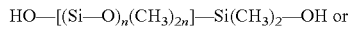

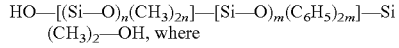

m is an integer such that $2 \leq m \leq 1000$,
preferably the α,ω-dihydroxypolysiloxanes, e.g. polydimethylsiloxane (OH end groups, 90-150 cST) or polydimethylsiloxane-co-diphenylsiloxane (dihydroxy end groups, 60 cST).

Dihydrohexamethyltrisiloxane, dihydrooctamethyltetrasiloxane, further homologous and isomeric compounds of the series H—[(Si—O)$_n$(CH$_3$)$_{2n}$]—Si(CH$_3$)$_2$—H, where
n is an integer such that $2 \leq n \leq 1000$, preferably the α,ω-dihydropolysiloxanes, e.g. polydimethylsiloxane (hydride end groups, M$_n$=580), di(hydroxypropyl)hexamethyltrisiloxane, di(hydroxypropyl)octamethyltetrasiloxane, further homologous and isomeric compounds of the series HO—(CH$_2$)$_u$[(Si—O)$_n$(CH$_3$)$_{2n}$]—Si(CH$_3$)$_2$(CH$_2$)$_u$—OH, preferably the α,ω-dicarbinolpolysiloxanes where $3 \leq u \leq 18$, $3 \leq n \leq 1000$ or their polyether-modified derivatives based on ethylene oxide (EO) and propylene oxide (PO) as homopolymers or copolymers HO-(EO/PO)$_v$—(CH$_2$)$_u$[(Si—O)$_t$(CH$_3$)$_{2t}$]—Si(CH$_3$)$_2$(CH$_2$)$_u$-(EO/PO)$_v$—OH, preferably α,ω-di(carbinol polyether)polysiloxanes where $3 \leq n \leq 1000$, $3 \leq u \leq 18$, $1 \leq v \leq 50$.

Instead of α,ω-OH groups, it is likewise possible to use the corresponding bifunctional compounds bearing epoxy, isocyanato, vinyl, allyl and di(meth)acryloyl groups, e.g. polydimethylsiloxane having vinyl end groups (850-1150 cST) or TEGORAD 2500 from Tego Chemie Service.

Further possibilities are the esterification products of ethoxylated/propoxylated trisiloxanes and higher siloxanes having acrylic acid copolymers and/or maleic acid copolymers as modifying compounds, e.g. BYK Silclean 3700 from Byk Chemie or TEGO® Protect 5001 from Tego Chemie Service GmbH.

Instead of α,ω-OH groups, it is likewise possible to use the corresponding bifunctional compounds bearing —NHR"" where R""=H or alkyl, e.g. the generally known amino silicone oils from Wacker, Dow Corning, Bayer, Rhodia, etc., which bear randomly distributed (cyclo)alkylamino groups or (cyclo)alkylimino groups on their polysiloxane chain.

Organosilanes of the type (RO)$_3$Si(C$_n$H$_{2n+1}$) and (RO)$_3$Si(C$_n$H$_{2n+1}$), where
R is an alkyl such as methyl, ethyl, n-propyl, i-propyl, butyl,
n is from 1 to 20.

Organosilanes of the type R'$_x$(RO)$_y$Si(C$_n$H$_{2n+1}$) and (RO)$_3$Si(C$_n$H$_{2n+1}$), where
R is an alkyl such as methyl, ethyl, n-propyl, i-propyl, butyl,
R' is an alkyl such as methyl, ethyl, n-propyl, i-propyl, butyl,
R' is a cycloalkyl,
n is an integer in the range 1-20,
x+y=3,
x is 1 or 2,
y is 1 or 2,
organosilanes of the type (RO)$_3$Si(CH$_2$)$_m$—R', where
R is an alkyl such as methyl, ethyl, propyl,
m is in the range 0.1-20,
R' is methyl, phenyl, —C$_4$F$_9$; OCF$_2$—CHF—CF$_3$, —C$_6$F$_{13}$, —O—CF$_2$—CHF$_2$, —NH$_2$, —N$_3$, —SCN, —CH=CH$_2$, —NH—CH$_2$—CH$_2$—NH$_2$, —N—(CH$_2$—CH$_2$—NH$_2$)$_2$, —OOC(CH$_3$)C=CH$_2$, —OCH$_2$—CH(O)CH$_2$, —NH—CO—N—CO—(CH$_2$)$_5$, —NH—COO—CH$_3$, —NH—COO—CH$_2$—CH$_3$, —NH—(CH$_2$)$_3$Si(OR)$_3$, —S$_x$—(CH$_2$)$_3$Si(OR)$_3$, —SH—NR'R"R'"(R'=alkyl, phenyl; R"=is alkyl, phenyl; R'"=H, alkyl, phenyl, benzyl, C$_2$H$_4$NR""R"" where R""=A, alkyl and R""=H, alkyl).

Preferred silanes are the silanes listed below:
triethoxysilane, octadecyltrimethoxysilane, 3-(trimethoxysilyl)propyl methacrylate, 3-(trimethoxysilyl)propyl acrylate, 3-(trimethoxysilyl)methyl methacrylate, 3-(trimethoxysilyl)methyl acrylate, 3-(trimethoxysilyl)ethyl methacrylate, 3-(trimethoxysilyl)ethyl acrylate, 3-(trimethoxysilyl)pentyl methacrylate, 3-(trimethoxysilyl)pentyl acrylate, 3-(trimethoxysilyl)hexyl methacrylate, 3-(trimethoxysilyl)hexyl acrylate, 3-(trimethoxysilyl)butyl methacrylate, 3-(trimethoxysilyl)butyl acrylate, 3-(trimethoxysilyl)heptyl methacrylate, 3-(trimethoxysilyl)heptyl acrylate, 3-(trimethoxysilyl)octyl methacrylate, 3-(trimethoxysilyl)octyl acrylate, methyltrimethoxysilane, methyltriethoxysilane, propyltrimethoxysilane, propyltriethoxysilane, isobutyltrimethoxysilane, isobutyltriethoxysilane, octyltrimethoxysilane, octyltriethoxysilane, hexadecyltrimethoxysilane, phenyltrimethoxysilane, phenyltriethoxysilane, tridecafluoro-1,1,2,2-tetrahydrooctyltriethoxysilane, tetramethoxysilane, tetraethoxysilane, oligomeric tetraethoxysilane (DYNASIL® 40 from Degussa), tetra-n-propoxysilane, 3-glycidyloxypropyltrimethoxysilane, 3-glycidyloxypropyltriethoxysilane, 3-methacryloxypropyltrimethoxysilane, vinyltrimethoxysilane, vinyltriethoxysilane, 3-mercaptopropyltrimethoxysilane, 3-aminopropyltriethoxysilane, 3-aminopropyltrimethoxysilane, 2-aminoethyl-3-aminopropyltrimethoxysilane, triamino-functional propyltrimethoxysilane (DYNASYLAN® TRIAMINO from Degussa), N-(n-butyl)-3-aminopropyltrimethoxysilane, 3-aminopropylmethyidiethoxysilane.

The silanes are preferably added in molar ratios of α-alumina to silane of from 1:1 to 10:1. The amount of organic solvent in the deagglomeration is generally from 80 to 90% by weight, based on the total amount of α-alumina and solvent. As solvents, it is in principle possible to use all organic solvents. Preference is given to $C_1$-$C_4$-alcohols, in particular methanol, ethanol or isopropanol, and also acetone or tetrahydrofuran.

The deagglomeration by milling and simultaneous modification by means of the silane is preferably carried out at temperatures of from 20 to 150° C., particularly preferably from 20 to 90° C.

If deagglomeration is effected by milling, the suspension is subsequently separated off from the milling media.

After deagglomeration, the suspension can be heated for a further period of up to 30 hours to complete the reaction. The solvent is subsequently distilled off and the residue which remains is dried.

It is also possible to suspend the α-alumina in the appropriate solvents and carry out the reaction with the silane in a further step after the deagglomeration.

The silane-modified nanosize α-alumina produced in this way can be incorporated into transparent surface transparent varnishes or surface coatings, resulting in improved scratch resistance. As a result of the modification by means of the silanes, the layers comprising nanosize α-alumina remain clear and display no clouding.

EXAMPLES

Example 1

150 g of α-alumina powder having a particle size in the range 10-50 µm and comprising crystallites of <100 nm were suspended in 110 g of isopropanol. 40 g of trimethoxyoctylsilane were added to the suspension and the mixture was fed into a vertical stirred ball mill from Netzsch (model PE 075). The milling media used comprises zirconium oxide (stabilized with yttrium) and had a size of 0.3-0.5 mm. After three hours, the suspension was separated off from the milling media and refluxed for a further 4 hours. The solvent was subsequently distilled off and the moist residue which remained was dried at 110° C. for a further 20 hours in a drying oven.

The SEM (scanning electron microscope) images showed the presence of crystallites in the range 10-100 nm.

Example 2

50 g of α-alumina powder having a particle size in the range 10-50 μm and comprising crystallites of <100 nm were suspended in 180 g of isopropanol. 20 g of trimethoxyoctadecylsilane were added to the suspension and the mixture was fed into a vertical stirred ball mill from Netzsch (model PE 075). The milling media used comprises zirconium oxide (stabilized with yttrium) and had a size of 0.3-0.5 mm. After three hours, the suspension was separated off from the milling media and refluxed for a further 4 hours. The solvent was subsequently distilled off and the moist residue which remained was dried at 110° C. for a further 20 hours in a drying oven.

Example 3

40 g of α-alumina powder having a particle size in the range 10-50 μm and comprising crystallites of <100 nm were suspended in 160 g of methanol. 10 g of 3-(trimethoxysilyl) propyl methacrylate were added to the suspension and the mixture was fed into a vertical stirred ball mill from Netzsch (model PE 075). The milling media used comprises zirconium oxide (stabilized with yttrium) and had a size of 0.3-0.5 mm. After three hours, the suspension was separated off from the milling media and refluxed for a further 4 hours. The solvent was subsequently distilled off and the moist residue which remained was dried at 80° C. for a further 20 hours in a drying oven.

The invention claimed is:

1. A process for producing nanosize α-alumina comprising the steps of mixing aluminum chlorohydrate as an aqueous solution with crystallization nuclei to form agglomerates of α-alumina, wherein the aluminum chlorohydrate is of the formula $Al_2(OH)_xCl_y$, wherein x is 2.5 to 5.5, y is 0.5 to 3.5 and x+y is 6;
   drying the agglomerates of α-alumina;
   heat treating the agglomerates of α-alumina; and
   deagglomerating the agglomerates of α-alumina by milling the agglomerates of α-alumina in the presence of an organic solvent and simultaneously or subsequently treated with a silane.

2. The process as claimed in claim 1, wherein the agglomerates are deagglomerated by milling at from 20 to 90° C.

3. The process as claimed in claim 1, wherein the organic solvent is a $C_1$-$C_4$-alcohol.

4. The process as claimed in claim 1, wherein a molar ratio of nanosize α-alumina to silane is from 1:1 to 10:1.

* * * * *